March 20, 1928.
E. M. COLE
1,662,883
FERTILIZER DISTRIBUTOR
Filed May 5, 1926
2 Sheets-Sheet 1
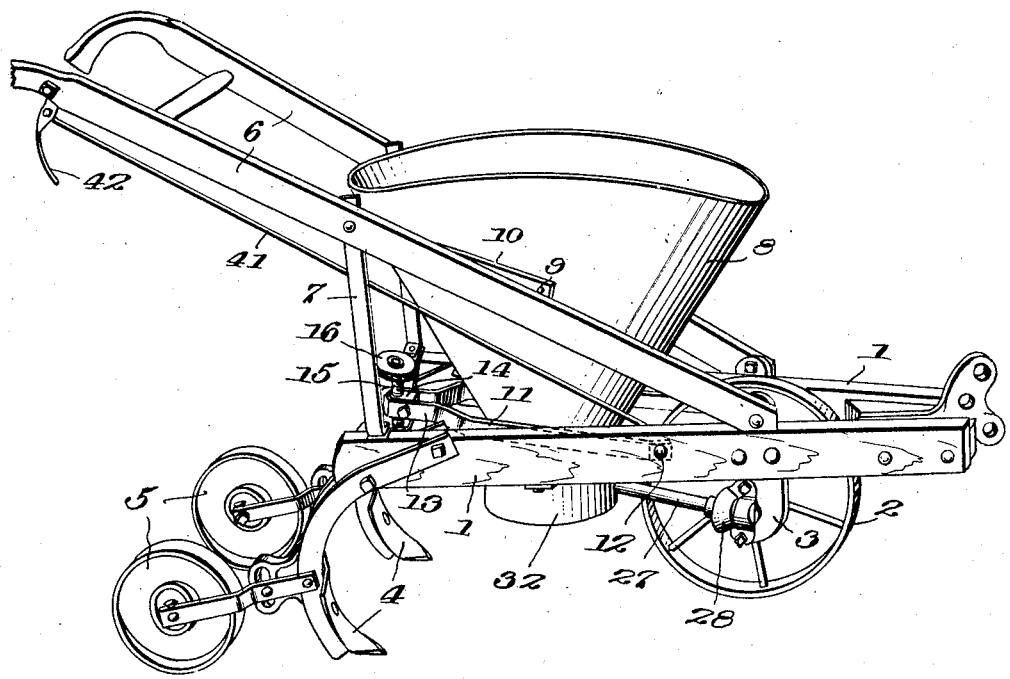

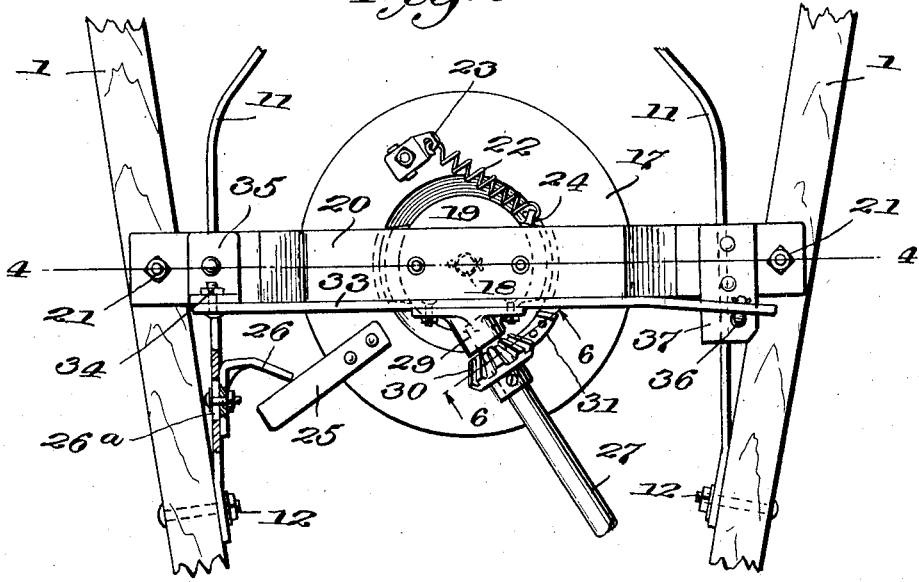

Patented Mar. 20, 1928.

1,662,883

UNITED STATES PATENT OFFICE.

EUGENE M. COLE, OF CHARLOTTE, NORTH CAROLINA.

FERTILIZER DISTRIBUTOR.

Application filed May 5, 1926. Serial No. 106,907.

This invention relates to agricultural implements and more particularly to a machine for distributing pulverized material such as fertilizer, lime, etc.

The invention relates to such a machine of the one-horse or single row type, and has for its object to provide a device of this character which shall be simple, positive and efficient in its operation, which shall uniformly distribute the material, and which is so constructed as to prevent packing of damp or more or less sticky fertilizers.

With the above and other objects in view, and to improve generally on the details of such apparatus, my invention consists in the construction, arrangement and combination of parts hereinafter described and claimed and illustrated in the accompanying drawings, in which:

Figure 1 is a perspective view of a complete fertilizer distributor embodying the invention;

Figure 2 is an inverted plan thereof;

Figure 3 is a fragmentary inverted plan on an enlarged scale, parts being shown in section;

Figure 4 is a transverse section on the line 4—4 of Figure 3;

Figure 5 is a fragmentary section on the line 5—5 of Figure 4;

Figure 6 is a fragmentary section on the line 6—6 of Figure 3; and

Figure 7 is a transverse section on the line 7—7 of Figure 2.

Referring to the drawings in detail, my improved distributor comprises a V-shaped frame made up of the side members 1. Near the front of the machine a ground wheel 2 is journalled in brackets 3 secured to the members 1. At the rear may be provided two or more cultivators such as 4, associated with gage wheels 5, by means of which the depth to which the cultivators enter the ground may be regulated.

A pair of handle bars 6 is provided, as usual, and these are secured at their forward ends to the bearing brackets 3 and are supported at the rear of the machine by braces 7.

A suitable tapering hopper 8 is provided, and is preferably formed of sheet metal. This hopper is open at both top and bottom and is supported near the top by being pivotally secured as at 9 to links 10 attached to the handle bars. The hopper is supported at its lower end on pivots $9^a$ carried by a bail member 11, pivoted at its free ends to the side members 1, as indicated at 12 and having its rear or central portion bent to form a loop 13 in which is bolted a block 14. An adjusting screw 15 is threaded through this block and is provided at its upper end with a hand wheel 16 by means of which it may be turned. The lower end of the screw 15 is swiveled in a block $16^a$ carried by a cross bar $1^a$ extending between the side members 1. From the foregoing, it is obvious that when the hand wheel and screw are turned, the block 14 is caused to travel on the screw and to thus raise or lower the rear end of the swinging bail 11 which supports the hopper. By this means, the hopper may be vertically adjusted as desired.

The lower end of the hopper is closed by means of a distributor plate 17, which constitutes a bottom. This plate, as clearly shown in Figure 4, has an inverted saucer-shaped middle portion provided at its center with a pivot lug 18. This pivot lug passes through an opening in a bearing boss 19, which is bolted or otherwise secured to a bearing hanger or cross bar 20, secured to the side frames 1 by means of bolts 21.

A helical spring 22 (see Figure 3) is attached at one end to a lug 23 secured to the under side of the plate 17, and at its other end to a fixed lug 24, carried by the cross bar 20. The tension of this spring tends to rotate the plate 17 about its pivot 18 in a clockwise direction, as viewed in Figure 3, such turning movement being limited by engagement of an arm 25 carried by the plate, with an adjustable stop 26 secured to the bail 11 by means of a bolt and slot connection, as shown at $26^a$. By adjusting the position of this stop 26, the extent of movement of the plate 17 may be varied.

A shaft 27 is geared at one end to the shaft of the ground wheel 2, as indicated at 28, and is journaled at its other end adjacent the plate 17 in a bearing 29. To the shaft is secured a spur wheel 30, somewhat resembling a bevelled pinion, and as shown in Figure 6, this spur wheel runs in close proximity to the lower surface of the plate 17. To this plate is rigidly attached a lug 31, having a square end so disposed as to be engaged by the successive teeth of the spur wheel as the latter revolves. Each time a tooth engages the lug 31, it is clear that the lug will be shifted in the direction of movement of the tooth, thus swinging the plate 17 a short distance about its center. Further movement of the spur wheel causes the tooth to slip off of the lug 31, and when this occurs, the spring 22 suddenly snaps the plate back in the opposite direction to that in which it was moved by the wheel. This snap action of the spur wheel tooth and spring causes the arm 25 to be brought sharply against the stop 26, thus producing a marked jarring action. This jarring action tends to dislodge any material which may be clinging to the plate 17, and, since the stop member 26 is carried by the bail 11 which supports the hopper, the vibration due to the jarring action is transmitted to the hopper also, thus tending to loosen the material which may cling to its sides.

By reference to Figure 4, it will be seen that the upper surface of the plate 17 is spaced a suitable distance below the lower edge 8$^a$ of the hopper, and that this constitutes an annular slot through which the material is discharged. The sudden angular movement imparted to the plate by the spring 22, although relatively short, tends to create a centrifugal force at the periphery of the plate which serves to throw off the material from the edge thereof. This, coupled with the jarring action, due to the sudden engagement of the arm 25 with the stop 26, results in uniformly feeding and distributing the fertilizer or other material from the hopper, as the machine travels along.

The bearing 29, which supports the rear end of the shaft 27, is carried by a bar 33 pivoted at 34 to a bracket 35. The other end of this bar is supported by a hook formed at the lower end of a vertically extending rod 36. The upper end of this rod is connected with one end of a bell crank lever 39, pivoted at 40 to the side member 1, and having an operating rod 41 connected with the other end thereof. This operating rod 41, as clearly shown in Figure 1, extends rearwardly and upwardly to a point adjacent the handle of the machine, where it is connected with a lever 42 pivoted to the handle bar in such a position as to be easily reached by the operator. Normally, the bar 33 and bearing 29 are held in the operative position shown in the drawings by means of a spring 38 surrounding the rod 36 and interposed between the end of the bell crank lever 39 and a bracket 37 through which the rod 36 passes, as clearly shown in Figure 5. When it is desired to throw the distributing mechanism out of operation, the lever 42 is swung rearwardly, and this through the rod 41 and bell crank lever 39, serves to depress the rod 36 and thus lower the bearing 29 and with it the shaft 27 to such an extent that the teeth of the spur wheel 30 no longer engage the lug 31.

In order to prevent the material being scattered too widely, and to direct it into a row, I may provide a depending apron 32 surrounding the distributor plate 17, as indicated in dotted lines in Figure 4, and as shown in full lines in Figure 1.

So far as I am aware, it is broadly new with me to provide an oscillatory distributor plate serving both by centrifugal force and by its jarring action to throw off and uniformly distribute granular material from its upper surface, and it is thought that the many advantages of this improved arrangement will be readily appreciated by those skilled in the art without further discussion.

What I claim is:—

1. A fertilizer distributor comprising a hopper, having a lower open end, a circular plate somewhat larger than the said lower end and spaced slightly below the same to provide an annular discharge opening, and means for oscillating said plate about its center.

2. A fertilizer distributor comprising a hopper, having a lower open end, a circular plate at said lower end and spaced slightly therefrom to provide an annular discharge opening, positive means for angularly displacing said plate about its center in one direction, and resilient means for forcibly moving it in the other direction.

3. A fertilizer distributor comprising a hopper, having a lower open end, a circular plate at said lower end and spaced slightly therefrom to provide an annular discharge opening, positive means for angularly displacing said plate about its center in one direction, resilient means for forcibly moving it in the other direction, and means for suddenly arresting such motion as the plate approaches its initial position.

4. A fertilizer distributor comprising a hopper having a lower open end, a circular plate at said lower end and spaced slightly therefrom to provide an annular discharge opening, positive means for angularly displacing said plate about its center, and resilient means for forcibly returning said plate into jarring contact with a stationary stop.

5. A fertilizer distributor comprising a hopper having a lower open end, a circular plate at said lower end and spaced slightly therefrom to provide an annular discharge opening, positive means for periodically angularly displacing said plate about its center, and resilient means for forcibly moving the plate back, after each displacement, into jarring contact with a stationary element.

6. A fertilizer distributor comprising a hopper having a lower open end, a circular plate at said lower end and spaced slightly therefrom to provide an annular discharge opening, positive means for turning said plate in one direction about its center, and resilient means for turning it in the other direction at such speed as to cause material on the surface thereof to be thrown off by centrifugal force.

7. A fertilizer distributor comprising a pair of spaced side frames, and a hopper having a lower open end, a circular plate at said lower end and spaced slightly therefrom to provide an annular discharge opening, means for turning said plate about its center to cause material to be fed from the hopper through said opening, a yoke on which said hopper is supported, said yoke being pivoted at one end to said side frames, and means for vertically swinging said yoke about its pivot to adjust the hopper relative to the plate for varying the width of said opening to regulate the rate of discharge.

8. A fertilizer distributor comprising a hopper having an open lower end, a circular plate rotatably mounted in fixed horizontal position beneath the lower open end of said hopper, a shaft having at its end a wheel adapted to normally engage and drive said plate, and means for shifting said shaft away from the plane of said plate so as to move said wheel out of engagement with the plate when it is desired to stop the operation of the latter.

9. A fertilizer distributor having a ground wheel and comprising a hopper having an open lower end, a circular plate rotatably mounted in fixed horizontal position beneath and spaced from the lower open end of said hopper, said plate having an unobstructed peripheral edge means operated by said ground wheel for causing said plate to continuously oscillate in its own plane as the machine travels along to throw material from its peripheral edge, and means for interrupting the operation of said oscillating means when desired.

10. A fertilizer distributor comprising a hopper having a lower open end, a circular plate at said lower end and spaced slightly therefrom to provide an annular discharge opening, means for oscillating said plate about its center to cause the material in the hopper to be discharged through said opening, and means for imparting a jar to the hopper at each oscillation of said plate.

11. A fertilizer distributor comprising a hopper, having a lower open end, a circular plate at said lower end and spaced slightly therefrom to provide an annular discharge opening, positive means for angularly displacing said plate about its center in one direction, resilient means for forcibly moving it in the other direction, a member carried by said plate, and a stop member mechanically connected with said hopper and arranged in the path of travel of said other member, whereby when said members come into engagement, the movement of said plate is suddenly arrested and a jar imparted to both the plate and hopper.

In testimony whereof I affix my signature.

EUGENE M. COLE.